United States Patent
Thomsen

(10) Patent No.: US 10,205,386 B2
(45) Date of Patent: Feb. 12, 2019

(54) APPARATUS FOR INTEGRATED CIRCUIT INTERFACE AND ASSOCIATED METHODS

(71) Applicant: Silicon Laboratories Inc., Austin, TX (US)

(72) Inventor: Axel Thomsen, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 338 days.

(21) Appl. No.: 14/726,402

(22) Filed: May 29, 2015

(65) Prior Publication Data

US 2015/0263613 A1 Sep. 17, 2015

Related U.S. Application Data

(63) Continuation of application No. 13/740,028, filed on Jan. 11, 2013, now Pat. No. 9,048,777.

(Continued)

(51) Int. Cl.
*H02M 3/07* (2006.01)
*H02P 27/06* (2006.01)
(Continued)

(52) U.S. Cl.
CPC ............ *H02M 3/07* (2013.01); *H02H 9/046* (2013.01); *H02P 6/14* (2013.01); *H02P 6/28* (2016.02);
(Continued)

(58) Field of Classification Search
CPC ............ H03F 3/45179; H03F 3/45632; H03F 2200/03; H03F 3/185; H03F 3/187;
(Continued)

(56) References Cited

U.S. PATENT DOCUMENTS 4,328,441 A * 5/1982 Kroeger, Jr. ............ G01L 1/162
310/319
4,797,582 A * 1/1989 Nguyen ................ H04L 5/1423
326/30

(Continued)

FOREIGN PATENT DOCUMENTS

CN 102655407 A 9/2012
CN 102754320 10/2012
(Continued)

OTHER PUBLICATIONS

Search report in Chinese patent application No. 2013106284341, filed Nov. 29, 2013, 2 pgs.

*Primary Examiner* — Kawing Chan
(74) *Attorney, Agent, or Firm* — Law Offices of Maximilian R. Peterson

(57) ABSTRACT

An apparatus includes an integrated circuit (IC) adapted to be powered by a positive supply voltage. The IC includes a charge pump that is adapted to convert the positive supply voltage of the IC to a negative bias voltage. The IC further includes a bidirectional interface circuit. The bidirectional interface circuit includes an amplifier coupled to the negative bias voltage to accommodate a bidirectional input voltage of the IC. The bidirectional interface circuit further includes a comparator coupled to the negative bias voltage to accommodate the bidirectional input voltage of the IC.

20 Claims, 12 Drawing Sheets

Related U.S. Application Data

(60) Provisional application No. 61/747,533, filed on Dec. 31, 2012.

(51) Int. Cl.
*H02H 9/04* (2006.01)
*H02P 6/14* (2016.01)
*H02P 6/28* (2016.01)
*H02M 1/00* (2006.01)
*H02P 31/00* (2006.01)

(52) U.S. Cl.
CPC ..... *H02P 27/06* (2013.01); *H02M 2001/0006* (2013.01); *H02P 31/00* (2013.01)

(58) Field of Classification Search
CPC .............. H03F 1/3211; H03F 2200/18; H03F 2200/213; H03F 2200/372; H03F 2200/447; H03F 2200/555; H03F 2203/45136; H03F 2203/45244; H02M 3/07; H02P 6/28; H02P 6/14; H02P 31/00
USPC ...................................................... 318/400.06
See application file for complete search history.

(56) References Cited

U.S. PATENT DOCUMENTS

| | | | | |
|---|---|---|---|---|
| 4,945,297 A * | 7/1990 | Coustre | G05B 19/0423 | 307/10.1 |
| 4,993,063 A * | 2/1991 | Kiko | H04L 25/026 | 379/405 |
| 5,541,531 A | 7/1996 | Kultgen | | |
| 5,554,951 A * | 9/1996 | Gough | H03F 3/005 | 327/337 |
| 5,555,421 A * | 9/1996 | Enzinna | H04B 10/2503 | 250/551 |
| 5,627,458 A | 5/1997 | Nevin | | |
| 5,757,223 A | 5/1998 | Nevin | | |
| 5,939,875 A * | 8/1999 | Felps | G01R 1/0416 | 324/115 |
| 6,128,231 A * | 10/2000 | Chung | G11C 16/12 | 365/185.18 |
| 6,300,820 B1 * | 10/2001 | Fotouhi | H02M 3/07 | 327/536 |
| 6,351,179 B1 * | 2/2002 | Ikehashi | G05F 1/465 | 323/316 |
| 6,392,859 B1 * | 5/2002 | Ohshima | H01L 27/0248 | 361/100 |
| 6,577,514 B2 * | 6/2003 | Shor | H02M 3/07 | 327/536 |
| 6,646,493 B2 * | 11/2003 | Butler | H02M 3/073 | 327/536 |
| 6,701,340 B1 * | 3/2004 | Gorecki | G06J 1/00 | 708/671 |
| 6,704,214 B1 * | 3/2004 | Gibbs | H02P 9/14 | 363/54 |
| 6,825,625 B1 * | 11/2004 | Karwath | H02P 6/08 | 318/400.01 |
| 6,977,533 B2 * | 12/2005 | Kernhof | H02H 11/003 | 327/110 |
| 6,985,005 B1 * | 1/2006 | Kim | H03F 3/45179 | 326/21 |
| 7,038,412 B2 * | 5/2006 | Karwath | H02P 6/08 | 318/400.22 |
| 7,057,424 B2 * | 6/2006 | Bolz | G01N 27/4065 | 327/108 |
| 7,058,121 B1 * | 6/2006 | Kim | H04L 5/1423 | 326/26 |
| 7,103,013 B1 * | 9/2006 | Kim | H04B 3/30 | 370/284 |
| 7,129,771 B1 * | 10/2006 | Chen | G11C 5/145 | 327/536 |
| 7,330,129 B2 * | 2/2008 | Crowell | B25B 23/14 | 318/479 |
| 7,362,165 B1 * | 4/2008 | Chen | G11C 5/145 | 327/536 |
| 7,427,900 B2 * | 9/2008 | Manetakis | H03L 7/093 | 327/157 |
| 7,456,648 B2 * | 11/2008 | Kim | H03F 3/45179 | 326/26 |
| 7,532,010 B2 * | 5/2009 | Kamel | G01D 3/08 | 324/503 |
| 7,599,316 B2 * | 10/2009 | Kim | H04B 3/30 | 370/284 |
| 7,652,522 B2 * | 1/2010 | Racape | G11C 5/145 | 327/536 |
| 7,692,477 B1 * | 4/2010 | Chen | G05F 3/205 | 327/534 |
| 7,705,653 B2 * | 4/2010 | Schell | G06F 13/4045 | 327/333 |
| 7,782,141 B2 * | 8/2010 | Witmer | H03F 1/0244 | 330/127 |
| 7,808,324 B1 * | 10/2010 | Woodford | H03F 3/185 | 330/296 |
| 7,830,209 B1 * | 11/2010 | Woodford | H03F 1/0211 | 330/279 |
| 7,847,583 B2 * | 12/2010 | Kim | H03F 3/45179 | 326/26 |
| 7,847,619 B1 * | 12/2010 | Chen | G11C 5/145 | 327/536 |
| 7,848,045 B1 * | 12/2010 | Li | G06F 1/32 | 318/599 |
| 7,863,854 B2 * | 1/2011 | Izaki | F24F 12/006 | 318/803 |
| 7,965,122 B2 * | 6/2011 | Schell | G06F 13/4072 | 326/62 |
| 8,116,240 B2 * | 2/2012 | Kim | H04B 3/30 | 370/284 |
| 8,193,852 B2 * | 6/2012 | Chen | G05F 3/205 | 327/534 |
| 8,358,098 B2 * | 1/2013 | Skinner | H02M 1/4208 | 307/98 |
| 8,429,981 B2 * | 4/2013 | Grosjean | G01P 15/125 | 73/771 |
| 8,531,228 B2 * | 9/2013 | Kollmann | H03K 19/018592 | 327/333 |
| 8,582,787 B2 * | 11/2013 | David | H03F 3/187 | 330/252 |
| 8,711,621 B2 * | 4/2014 | Kim | G11C 11/5628 | 365/185.03 |
| RE45,050 E * | 7/2014 | Terlizzi | H04L 27/32 | 324/527 |
| 8,823,459 B2 * | 9/2014 | Obkircher | H03B 5/1228 | 327/291 |
| RE45,492 E * | 4/2015 | Terlizzi | H04L 27/32 | 324/527 |
| 9,350,305 B2 * | 5/2016 | David | H03F 3/187 | |
| 2002/0041531 A1 * | 4/2002 | Tanaka | G11C 5/145 | 365/205 |
| 2002/0145892 A1 * | 10/2002 | Shor | H02M 3/07 | 363/59 |
| 2003/0034826 A1 * | 2/2003 | Butler | H02M 3/073 | 327/536 |
| 2003/0225317 A1 * | 12/2003 | Schell | G06F 13/4072 | 600/300 |
| 2004/0099530 A1 * | 5/2004 | Bolz | G01N 27/4065 | 204/406 |
| 2004/0207453 A1 * | 10/2004 | Kernhof | H02H 11/003 | 327/424 |
| 2005/0011655 A1 * | 1/2005 | Crowell | B25B 23/14 | 173/1 |
| 2005/0035733 A1 * | 2/2005 | Karwath | H02P 6/08 | 318/434 |
| 2005/0127859 A1 * | 6/2005 | Kernhof | H02H 11/003 | 318/400.29 |
| 2006/0145770 A1 * | 7/2006 | Manetakis | H03L 7/0896 | 331/16 |

(56) References Cited

U.S. PATENT DOCUMENTS

| | | | | |
|---|---|---|---|---|
| 2006/0170449 A1* | 8/2006 | Kim | H03F 3/45179 | 326/26 |
| 2006/0256744 A1* | 11/2006 | Kim | H04B 3/30 | 370/284 |
| 2007/0164825 A1* | 7/2007 | Rollins | H03F 1/34 | 330/308 |
| 2008/0074117 A1* | 3/2008 | Kamel | G01D 3/08 | 324/503 |
| 2008/0122506 A1* | 5/2008 | Racape | G11C 5/145 | 327/157 |
| 2008/0157830 A1* | 7/2008 | Kume | H03K 7/08 | 327/110 |
| 2008/0290949 A1* | 11/2008 | Chen | H02M 3/07 | 330/297 |
| 2009/0052215 A1* | 2/2009 | Watanabe | H02M 7/53873 | 363/131 |
| 2009/0137208 A1* | 5/2009 | Kim | H03F 3/45179 | 455/63.1 |
| 2010/0054369 A1* | 3/2010 | Moon | H04L 25/0288 | 375/340 |
| 2010/0142419 A1* | 6/2010 | Kim | H04B 3/30 | 370/285 |
| 2010/0176788 A1* | 7/2010 | Sun | G01R 19/0092 | 324/76.11 |
| 2010/0201434 A1* | 8/2010 | Chen | G05F 3/205 | 327/534 |
| 2011/0032738 A1 | 2/2011 | Skinner et al. | | |
| 2012/0223758 A1 | 9/2012 | Koellmann | | |
| 2012/0242379 A1* | 9/2012 | Obkircher | H03B 5/1228 | 327/117 |
| 2013/0052969 A1* | 2/2013 | Seshita | H04B 1/48 | 455/83 |

FOREIGN PATENT DOCUMENTS

| | | |
|---|---|---|
| JP | 8-307212 A | 11/1996 |
| TW | 333373 U1 | 6/1998 |

* cited by examiner

APPARATUS FOR INTEGRATED CIRCUIT INTERFACE AND ASSOCIATED METHODS

CROSS-REFERENCE TO RELATED APPLICATIONS

This application is a continuation of U.S. patent application Ser. No. 13/740,028, filed on Jan. 11, 2013, titled 'APPARATUS FOR INTEGRATED CIRCUIT INTERFACE AND ASSOCIATED METHODS,' which claims priority to U.S. Provisional Patent Application No. 61/747,533, filed on Dec. 31, 2012, titled 'Apparatus for Integrated Circuit Interface and Associated Methods.' The foregoing applications are incorporated by reference in their entireties for all purposes.

TECHNICAL FIELD

The disclosures relates generally to electronic circuitry and, more particularly, to apparatus for bidirectional interface circuitry for integrated circuits (ICs), and associated methods.

BACKGROUND

Advances in electronics have resulted in an increasing number of functions and capabilities being realized by semiconductor devices, for example, integrated circuits (ICs), such as microcontroller units (MCUs). To provide those functions and capabilities, semiconductor devices, such as MCUs, continue to include an increasing number of transistors.

To reduce cost and yet meet the specifications for more functions and capabilities, semiconductor technology has continued to drive the trend towards higher device density and smaller device geometries. Circuit techniques have also eliminated or reduced the use of several power supplies, such as bipolar power supplies (i.e., providing both positive and negative supply voltages). As a result, some ICs, such as typical MCUs, operate from a single positive supply voltage.

SUMMARY

A variety of bidirectional interface circuits and related techniques are disclosed and contemplated. In one exemplary embodiment, an apparatus includes an IC adapted to be powered by a positive supply voltage. The IC includes a charge pump that is adapted to convert the positive supply voltage of the IC to a negative bias voltage. The IC further includes a bidirectional interface circuit. The bidirectional interface circuit includes an amplifier coupled to the negative bias voltage to accommodate a bidirectional input voltage of the IC. The bidirectional interface circuit further includes a comparator coupled to the negative bias voltage to accommodate the bidirectional input voltage of the IC.

According to another exemplary embodiment, a motor control system includes a motor, and an inverter coupled to the motor in order to supply power to the motor. The apparatus further includes an MCU that is adapted to be powered from a positive supply voltage. The MCU includes a charge pump that is adapted to receive the positive supply voltage of the MCU as an input, and to generate a negative bias output voltage. The MCU also includes an interface circuit adapted to interface the MCU to a sense resistor to receive a bidirectional input signal corresponding to a sensed current of the inverter. The interface circuit includes an amplifier coupled to the negative bias output voltage of the charge pump to accommodate the bidirectional input signal. The interface circuit further includes a comparator coupled to the negative bias output voltage of the charge pump to accommodate the bidirectional input signal.

According to another exemplary embodiment, a method of accommodating a bidirectional input signal having a positive swing and a negative swing in an IC whose power is supplied from a positive supply voltage includes converting, using a charge pump, the positive supply voltage of the IC to a negative bias voltage. The method further includes amplifying the bidirectional input voltage of the IC, using an amplifier coupled to the negative bias voltage to accommodate the bidirectional input voltage of the IC. In addition, the method includes comparing the bidirectional input voltage of the IC to a voltage, using a comparator coupled to the negative bias voltage to accommodate the bidirectional input voltage of the IC.

BRIEF DESCRIPTION OF THE DRAWINGS

The appended drawings illustrate only exemplary embodiments and therefore should not be considered as limiting its scope. Persons of ordinary skill in the art appreciate that the disclosed concepts lend themselves to other equally effective embodiments. In the drawings, the same numeral designators used in more than one drawing denote the same, similar, or equivalent functionality, components, or blocks.

DETAILED DESCRIPTION

The disclosure relates generally to interface circuits for ICs. More specifically, the disclosure relates to apparatus for bidirectional interface circuits for ICs, such as microcontroller units (MCUs). Interface circuits according to various embodiments provide a flexible, yet powerful, mechanism for interfacing ICs to external circuitry, as described below in detail.

In some applications, an IC interfacing with external circuitry may encounter input signals having both positive and negative values or swings. In such situations, a bidirectional interface circuit, i.e., an interface circuit capable of tolerating, operating with, or accommodating the input signals with both polarities, is desirable. Bidirectional interface circuits according to various embodiments provide this advantage. Other advantages of various embodiments are described below in detail.

Conventionally, typical bidirectional interface circuits have used bipolar power supplies. More specifically, such approaches use a negative power supply voltage in addition to a positive power supply voltage. In that scenario, given properly selected power supply and/or input signal voltages, the input common mode voltage would not exceed the power supply rail voltages. This approach may be relatively complicated, especially if a low noise amplifier is supplied from the negative supply.

Interface circuits according to various embodiments provide the advantage of operating from a single positive power supply voltage. Such interface circuits produce a negative internal voltage by using a charge pump in order to provide bidirectional interface capability.

Figure 1:
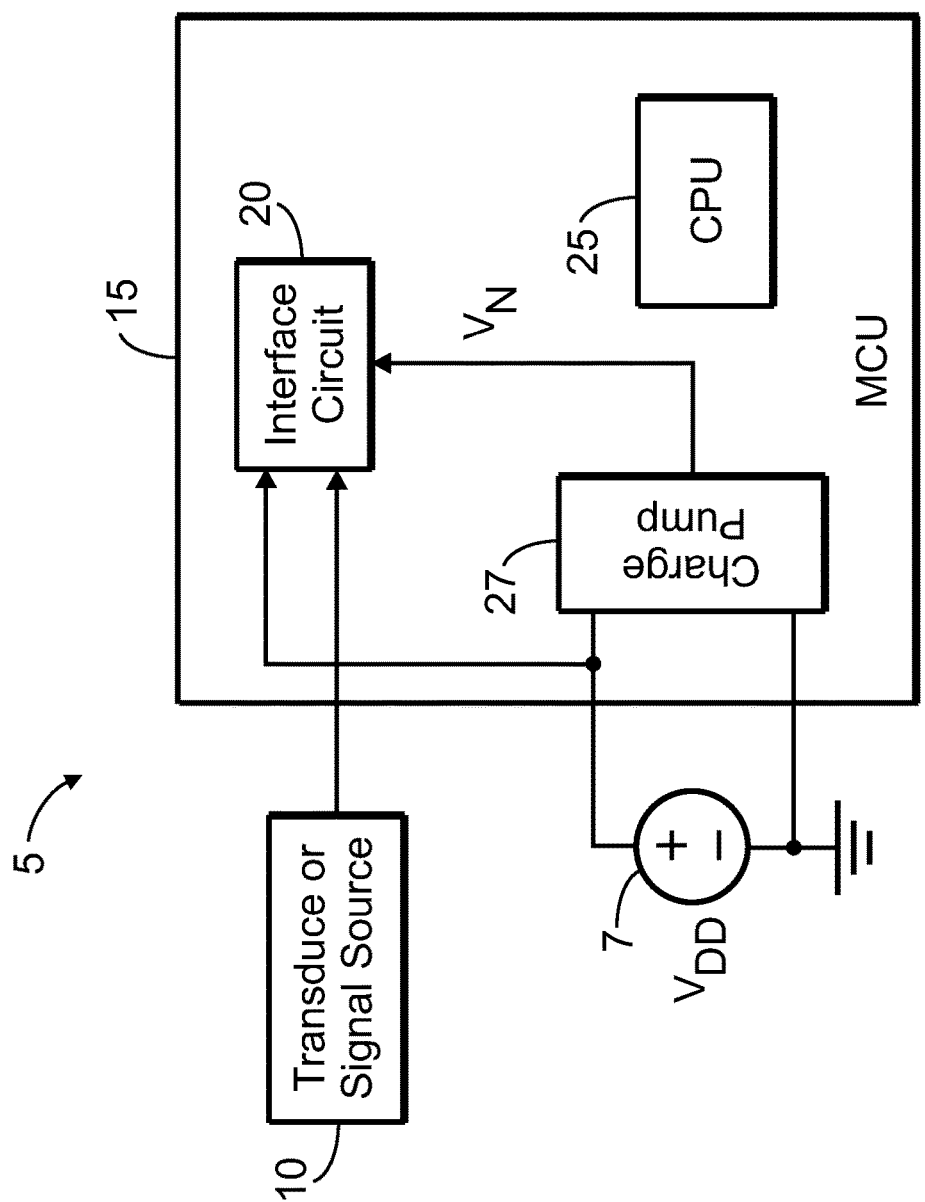
FIG. 1 illustrates a block diagram of a circuit arrangement for a bidirectional interface according to an exemplary embodiment.

Bidirectional input signal processing may take a variety of forms. FIG. 1 illustrates a block diagram of a circuit arrangement 5 for a bidirectional interface according to an exemplary embodiment. Circuit arrangement 5 shows a transducer or signal source 10 coupled to an input of an MCU 15.

Transducer or signal source 10 generally provides a bidirectional signal to the input of MCU 15. In other words, the output signal of transducer or signal source 10 has both positive and negative voltage (or current) swings or polarities. Transducer or signal source 10 may constitute a variety of devices or circuits, such as sensors and the like, as persons of ordinary skill in the art understand.

MCU 15 includes bidirectional interface circuit 20. As noted, bidirectional interface circuit 20 may tolerate, accommodate, or operate with both positive and negative input voltages. In this manner, MCU 15 can interface with transducer or signal source 10 without using an additional power supply voltage, such as a negative power supply voltage.

In exemplary embodiments, MCU 15 is powered by one or more positive supply voltages, such as supply voltage $V_{DD}$ shown in FIG. 1, provided by supply voltage source 7. MCU 15, however, does not use an externally provided negative supply voltage. Thus, interface circuit arrangements according to exemplary embodiments have the advantage of relatively simple power supply configurations.

MCU 15 includes charge pump 27. Charge pump 27 is coupled to supply voltage source 7 (i.e., receives $V_{DD}$ as an input voltage). Charge pump 27 converts the voltage $V_{DD}$ to a negative bias voltage $V_N$. Negative bias voltage $V_N$ is supplied to interface circuit 20. Bidirectional interface circuit 20 uses negative bias voltage $V_N$ as a bias voltage for circuits (described below in detail) that can tolerate, accommodate, or operate with bidirectional input voltages. Consequently, bidirectional interface circuit 20 provides a flexible mechanism for interfacing with transducer or signal source 10.

Low noise circuits typically use relatively high currents to operate, as the noise of a metal oxide semiconductor (MOS) device scales with power. A power supply, as used in conventional circuits, provide the relatively large currents consumed. The interface circuits according to various embodiments provide the advantage of using the negative bias signal, $V_N$, which provides a relatively small current, which is desirable in low power or portable applications.

The integrated charge pump 27 can generate the negative bias signal, $V_N$, but not enough current for a conventional low-noise amplifier. The circuitry in bidirectional interface circuit 20 do not draw significant power from charge pump 27, and is therefore suitable for use with the negative bias voltage, $V_N$.

In exemplary embodiments, MCU 15 includes central processing unit (CPU) 25. CPU 25 performs general control of MCU 15, and may also provide a variety of data or information processing capabilities, as persons of ordinary skill in the art understand. Without limitation, CPU 25 may perform general programmable logic, arithmetic, control, and/or other tasks.

CPU 25 may also perform various tasks related to specific applications or end-uses. For example, in some embodiments, CPU 25 may perform motor control tasks, as described below in detail.

In some embodiments, MCU 15 may include one or more circuits for storing firmware. The firmware allows more flexible programming or configuration of MCU 15 for desired tasks, such as motor control. In exemplary embodiments, the firmware may be stored in non-volatile memory (NVM), such as electrically programmable read only memory (EPROM), flash memory, and the like. The firmware may be programmed in variety of ways, as persons of ordinary skill in the art understand, for example, by using links (not shown) that interface with circuitry external to MCU 15.

In exemplary embodiments, interface circuit 20 operates in conjunction with CPU 25 (and firmware, as desired) and/or other circuitry (not shown) to perform various signal, data, or information processing tasks. Examples include amplification, comparator functions, digital input/output (I/O), analog I/O, mixed signal I/O, analog to digital conversion (ADC), digital to analog conversion (DAC), etc. The choice of such tasks depends on the design and performance specifications for a given implementation or end use, as persons of ordinary skill in the art understand.

Note that FIG. 1 illustrates a simplified block diagram of MCU 15. MCU 15 may include a variety of other circuits to provide desired features or functionality. Without loss of generality and limitation, MCU 15 may include one or more of other circuitry, such as a power-on reset (POR) circuit, power management unit (PMU), host interface circuitry, brownout detector, watchdog timer, and the like. In some embodiments, one or more of the above circuits may be included in MCU 15, as desired.

Furthermore, rather than using an MCU, one may use other types of circuits and/or firmware or software to implement motor control systems according to various embodiments. For example, one may use microprocessors, finite state machines, programmable logic (e.g., field programmable gate arrays), and the like, by making appropriate modifications to the circuitry shown in FIG. 1. The choice of circuitry and associated firmware/software depends on factors such as design and performance specifications for a given implementation, available technology, cost, etc., as persons of ordinary skill in the art understand.

In addition, note that, rather an MCU as shown in the exemplary embodiment of FIG. 1, generally any type of IC may include bidirectional interface circuit 20, as desired. The choice of type and configuration of such ICs depend on factors such as design and performance specifications, available technology, end-use, user preferences, cost, and the like, as persons of ordinary skill in the art understand.

As noted, bidirectional interface circuits according to various embodiments may be used in a variety of situations.

Without limitation and loss of generality, one application includes motor control. In this application, MCU 15 receives signals (for example, current signals or levels) related to the operation of the external motor, and provides signals to an external inverter to control the motor.

Figure 2:
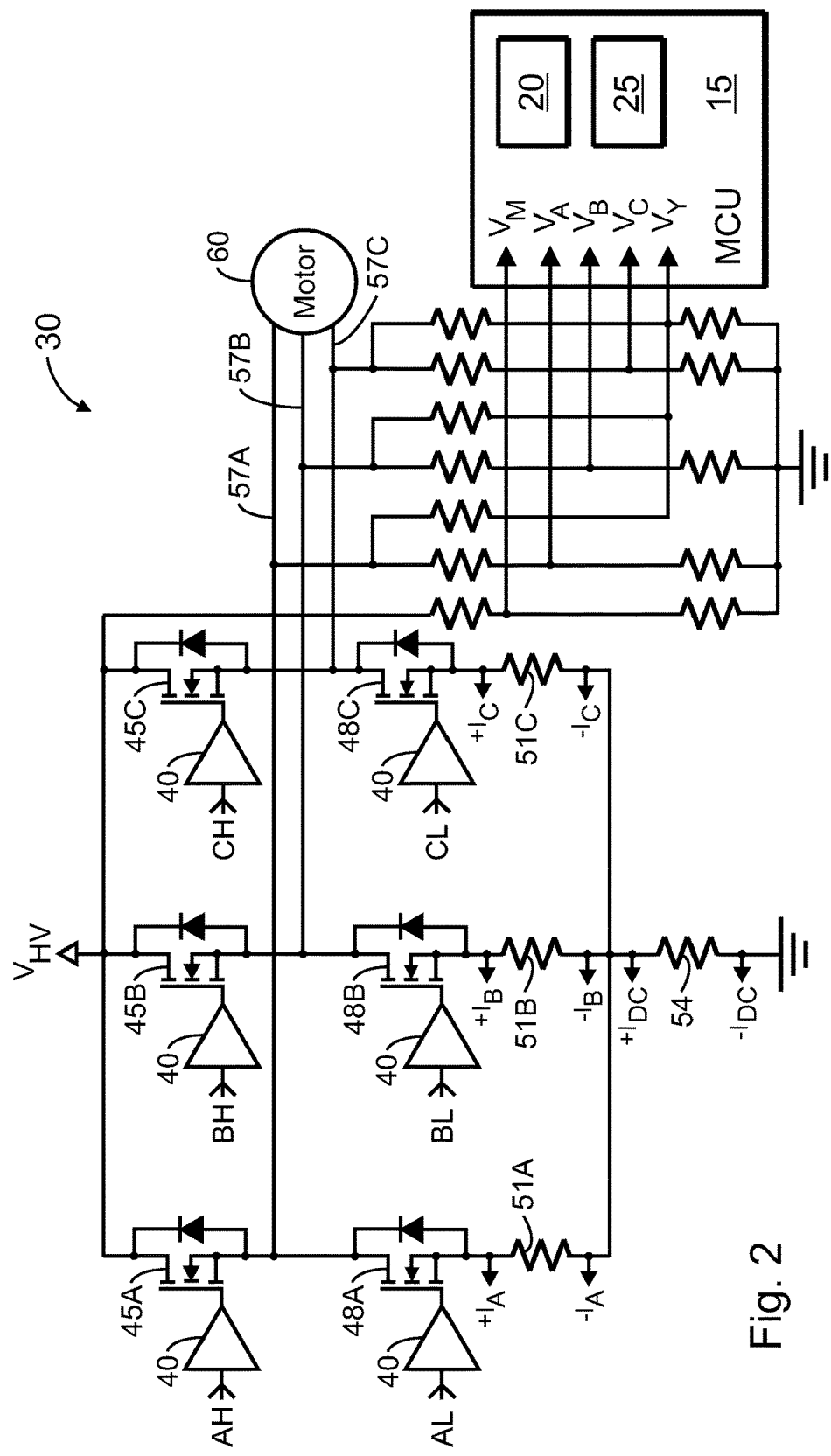
FIG. 2 depicts a circuit arrangement for interfacing to motor control circuitry according to an exemplary embodiment.

FIG. 2 depicts a circuit arrangement 30 for interfacing MCU 15 to motor control circuitry according to an exemplary embodiment. Generally, FIG. 2 shows a three phase inverter coupled to a motor 60. In addition, FIG. 2 shows a set of resistor dividers to scale various voltages related to the inverter/and or motor 60, as described below in detail. Furthermore, FIG. 2 shows current sensing or sense resistors 51A-51C and 54, as described below in detail.

In the embodiment shown, the inverter is a three phase inverter and drives a three phase motor 60. As persons of ordinary skill in the art understand, however, other arrangements are possible, and contemplated, and may be implemented by making appropriate modifications.

For example, in some embodiments, the inverter may be a single phase inverter and may drive a single phase motor. In such a situation, two of the three inverter legs shown in FIG. 2 are used to drive the single phase motor. Generally, the topology of the inverter and type of motor depend on the design and performance specifications for a given motor control system implementation, as persons of ordinary skill in the art understand.

Referring to the exemplary embodiment shown in FIG. 2, the inverter includes three legs or circuit branches. Each leg includes an upper transistor, and a lower transistor. FIG. 2 includes upper transistors 45A-45C and lower transistors 48A-48C, which correspond to the three phases, respectively.

Transistors 45A-45C and 48A-48C act as switches to provide power from a link or supply, with a voltage $V_{HV}$, to motor 60, in a manner known to persons of ordinary skill in the art. Note that, although FIG. 2 shows power metal oxide semiconductor field effect transistors (MOSFETs), other types of switch or device may be used, as persons of ordinary skill in the art understand.

Without limitation, bipolar junction transistors (BJTs), insulated gate bipolar transistors (IGBTs), etc., may be used, as desired. The choice of switch or device selection depends on a variety of factors, such as power and/or voltage level, size of motor 60, switching frequency of the devices, cost, available technology, etc., as persons of ordinary skill in the art understand.

A set of buffers or drivers 40 drive upper transistors 45A-45C and lower transistors 48A-48C. Drivers 40 may provide appropriate drive signals to cause the switching of upper transistors 45A-45C (n-channel MOSFETs in the embodiment shown) and lower transistors 48A-48C (n-channel MOSFETs in the embodiment shown) in response to control signals from MCU 15. Note that, in some embodiments, upper transistors 45A-45C may be p-channel MOSFETs, depending on factors such as voltage an power levels, as persons of ordinary skill in the art understand.

More specifically, a set of control signals AH-CH serve as input signals to drivers 40 for upper transistors 45A-45C, respectively. Another set of control signals, AL-CL, serve as input signals to drivers 40 for lower transistors 48A-48C, respectively. By controlling signals AH-CH and AL-CL, MCU 15 may control upper transistors 45A-45C and lower transistors 48A-48C, thus controlling the supply of power to the corresponding phases of motor 60.

More specifically, node 57A of upper transistor 45A and lower transistor 48A drives the first phase of motor 60. Node 57B of upper transistor 45B and lower transistor 48B drives the second phase of motor 60. Finally, node 57C of upper transistor 45C and lower transistor 48C drives the third phase of motor 60.

A set of current sense resistors, 51A-51C, sense the current flowing in each leg or branch of the inverter, by generating a set of voltages that are supplied to MCU 15. More specifically, resistor 51A senses the current flowing in the first branch of the inverter, giving rise to voltages $+I_A$ and $-I_A$. The difference between voltages $+I_A$ and $-I_A$ is proportional to the current through the first branch of the inverter. Thus, resistor 51A provides a differential signal to MCU 15 that is proportional to and indicates the level of current in the first branch of the inverter.

Similarly, resistor 51B senses the current flowing in the second branch of the inverter, giving rise to voltages $+I_B$ and $-I_B$, which is provided to MCU 15 as a differential signal. Finally, resistor 51C senses the current flowing in the third branch of the inverter, giving rise to voltages $+I_C$ and $-I_C$, which is provided to MCU 15 as a differential signal.

Note that in some embodiments, the current may be sensed by using two sense resistors, for example, 51A-51B. In this situation, voltages $+I_A$ and $-I_A$ and $+I_B$ and $-I_B$ are provided to MCU 15 as differential signals. In other embodiments, current may be sensed by one resistor.

Specifically, resistor 54 may be used to sense the current flowing through the branches of the inverter (more specifically, through lower transistors 48A-48C), to develop voltages $+I_{DC}$ and $-I_{DC}$. Voltages $+I_{DC}$ and $-I_{DC}$ may be provided to MCU 15 as a differential signal.

As noted, in some embodiments, some of the current sense resistors might not be used. In such situations, the unused resistors may be replaced with short circuits (e.g., a length of wire, PCB trace, etc.) to decrease or eliminate the power that would otherwise be dissipated in the unused sense resistor(s).

As noted, a set of resistor dividers are used to scale various voltages in the circuit shown in FIG. 2. The resistor dividers scale the motor or link voltages down to levels that are safe, compatible, or comparable to the supply and/or input voltages of MCU 15.

Thus, resistor dividers scale the three phase voltages and provide the resulting scaled phase voltages as $V_A$, $V_B$, and $V_C$, respectively. Similarly, a resistor divider is used to scale the supply or link voltage, $V_{HV}$, down to a voltage $V_M$. An additional resistor divider provides a scaled virtual Y sum of the three phase voltages as $V_Y$.

Note that, depending on the type of motor control technique, some of the resistor dividers may not be used. For example, the resistor divider that generates $V_M$ is used for field oriented control. Thus, for field oriented control, the other voltage dividers may not be used.

The various voltages from the resistor dividers (e.g., $V_A$-$V_C$, $V_M$, $V_Y$) are provided to MCU 15. MCU 15 uses those voltages to perform motor control in various modes of operation.

Note that in some embodiments, the various voltages present in the circuit in FIG. 2 (e.g., $V_A$-$V_C$, $V_Y$) may be comparable to, or safe to apply to, MCU 15. In such situations, the applicable resistor dividers may be omitted, as desired, and the corresponding voltages may be coupled to MCU 15.

Figure 3:
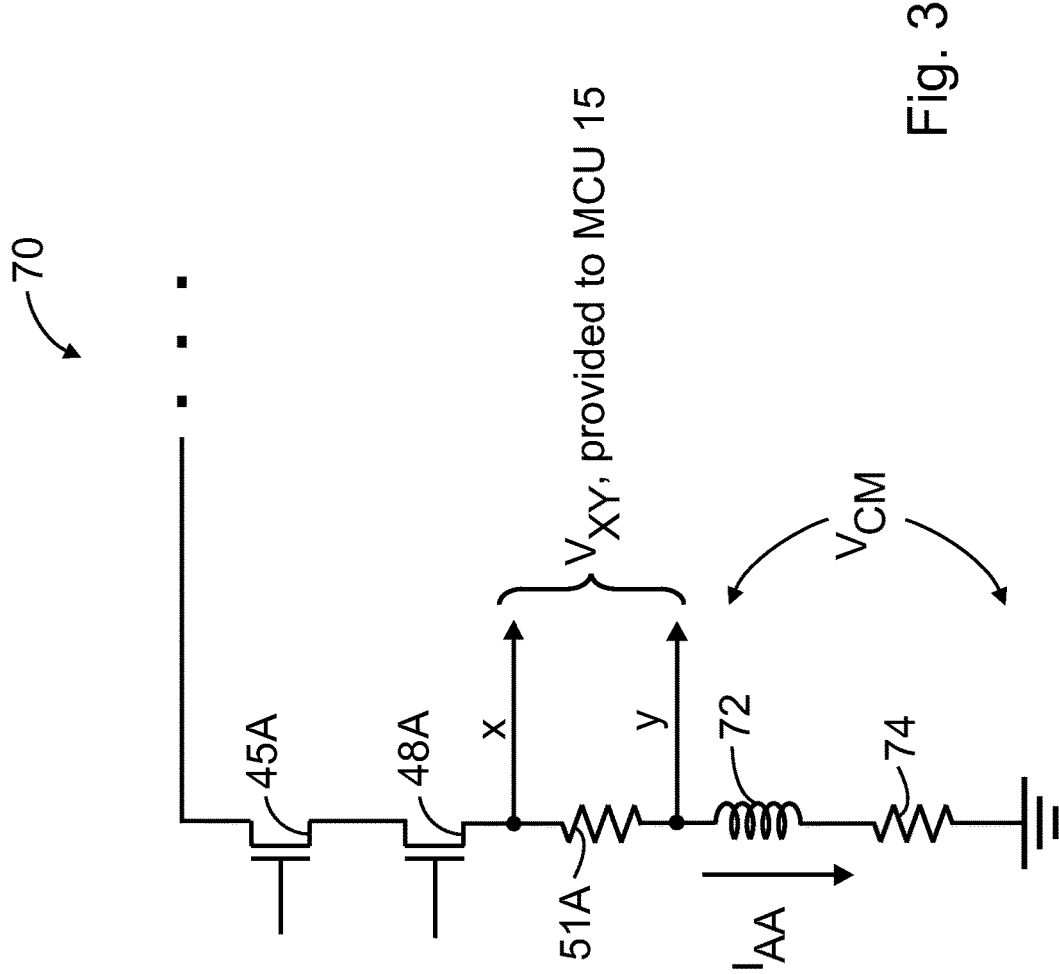
FIG. 3 shows a mechanism that gives rise to negative input voltages to an MCU used in a motor control application.

Some of the signals provided to MCU 15 may be bidirectional signals. For example, the signals corresponding to the sensed currents may be bidirectional. More specifically, the presence of parasitics and/or other circuit properties (e.g., negative phase currents) in a given implementation may give rise to a negative input voltage to MCU 15, for example, a negative common mode voltage. FIG. 3 shows a circuit arrangement 70 to illustrate this effect.

Without loss of generality, FIG. 3 uses the first leg or branch of the inverter shown in FIG. 2. In addition, FIG. 3 shows parasitic inductor 72 and parasitic resistor 74. Parasitic inductor 72 represents parasitic inductance in the circuit from sources such as wiring, PCB traces, leads etc. Similarly, parasitic resistor 74 represents parasitic resistance in the circuit from sources such as wiring, PCB traces, leads etc.

Phase or branch current $I_{AA}$ flows through parasitic inductor 72 and parasitic resistor 74. Note that, generally, current $I_{AA}$ may be positive in some instances, and negative in others. Furthermore, the current may have fluctuating values, for example, as motor 60 (see FIG. 2) slows down, accelerates, etc.

According to Ohm's Law, negative branch currents cause a negative voltage drop across parasitic resistor 74. Furthermore, changing branch currents may also cause negative voltages to develop across parasitic inductor 72 (as prescribed by the familiar equation, $V_L = L\, d_i/d_t$, where $V_L$ and L represent the voltage across, and the inductance of, parasitic inductor 72, respectively).

As a consequence, the input(s) of MCU 15 may experience negative voltages, such as negative common mode voltages represented by $V_{CM}$ in FIG. 3. In some embodiments, the negative voltage may be on the order of about −700 mV, or even lower. Such voltages would ordinarily cause several problems, such as inadvertently turned on transistors or electrostatic discharge (ESD) diodes. Bidirectional interface circuit 20, however, can accommodate, tolerate, or operate with such negative input voltages, as described below.

Figure 4:
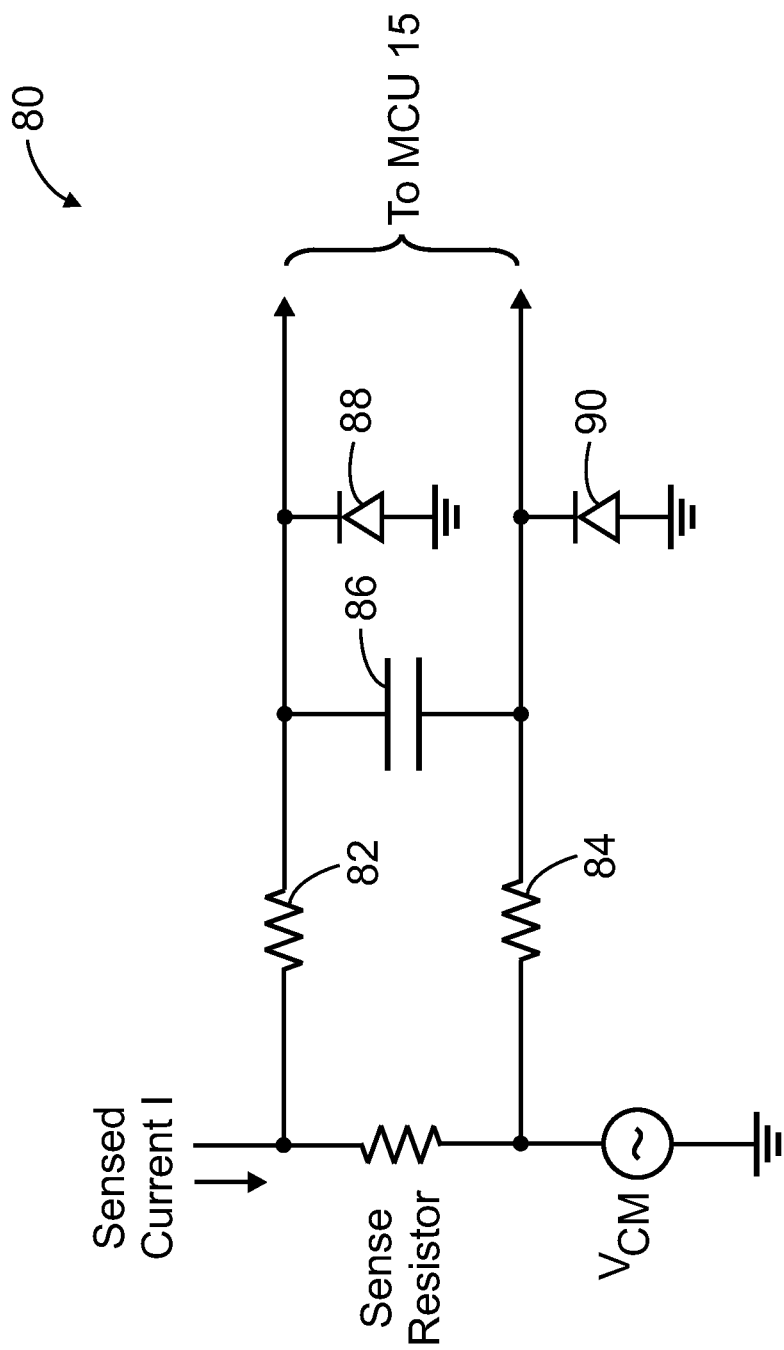
FIG. 4 depicts a circuit arrangement for input signal conditioning according to an exemplary embodiment.

In addition to using bidirectional interface circuit 20, which is internal to MCU 15, some circuitry may be used externally to MCU 15 to combat the effects of negative input common mode voltages, e.g., to perform some signal conditioning or processing. FIG. 4 shows a circuit arrangement 80 for doing so according to an exemplary embodiment.

Specifically, FIG. 4 illustrates using resistors 82 and 84, capacitor 86, and diodes 88 and 90 to condition or process a voltage across a sense resistor that corresponds to a sensed current, I, in the presence of common mode voltage $V_{CM}$. Resistors 82 and 84 help increase the overall input impedance of the circuit, as seen from the perspective of the sense resistor. As a result, the input current drawn from the sense resistor is decreased. In an exemplary embodiment, the input current may be on the order of about 1 μA.

Capacitor 86 performs filtering of the input voltage, which corresponds to the sensed current. More specifically, capacitor 86 filters relatively high frequencies from the input voltage. Note that because resistors 82 and 84 limit the current that can flow into MCU 15, they allow for implementation of over-voltage protection, and they also allow for implementing a single pole filter for noise and glitch rejection. The presence of resistors 82 and 84 and the relatively small input current into MCU 15 avoids signal corruption because of ohmic (or I×R) voltage drops.

Diodes 88 and 90 protect the inputs of MCU 15 (not shown). In the presence of relatively high or excessive negative input signals across the sense resistor, one or both of diodes 88 and 90 turn on. As a result, the conducting diode(s) shunt current from the inputs of MCU 15, and help to protect it. Note that resistors 82 and 84 help to limit the current conducted by diode 88 and/or diode 90.

Figure 5:
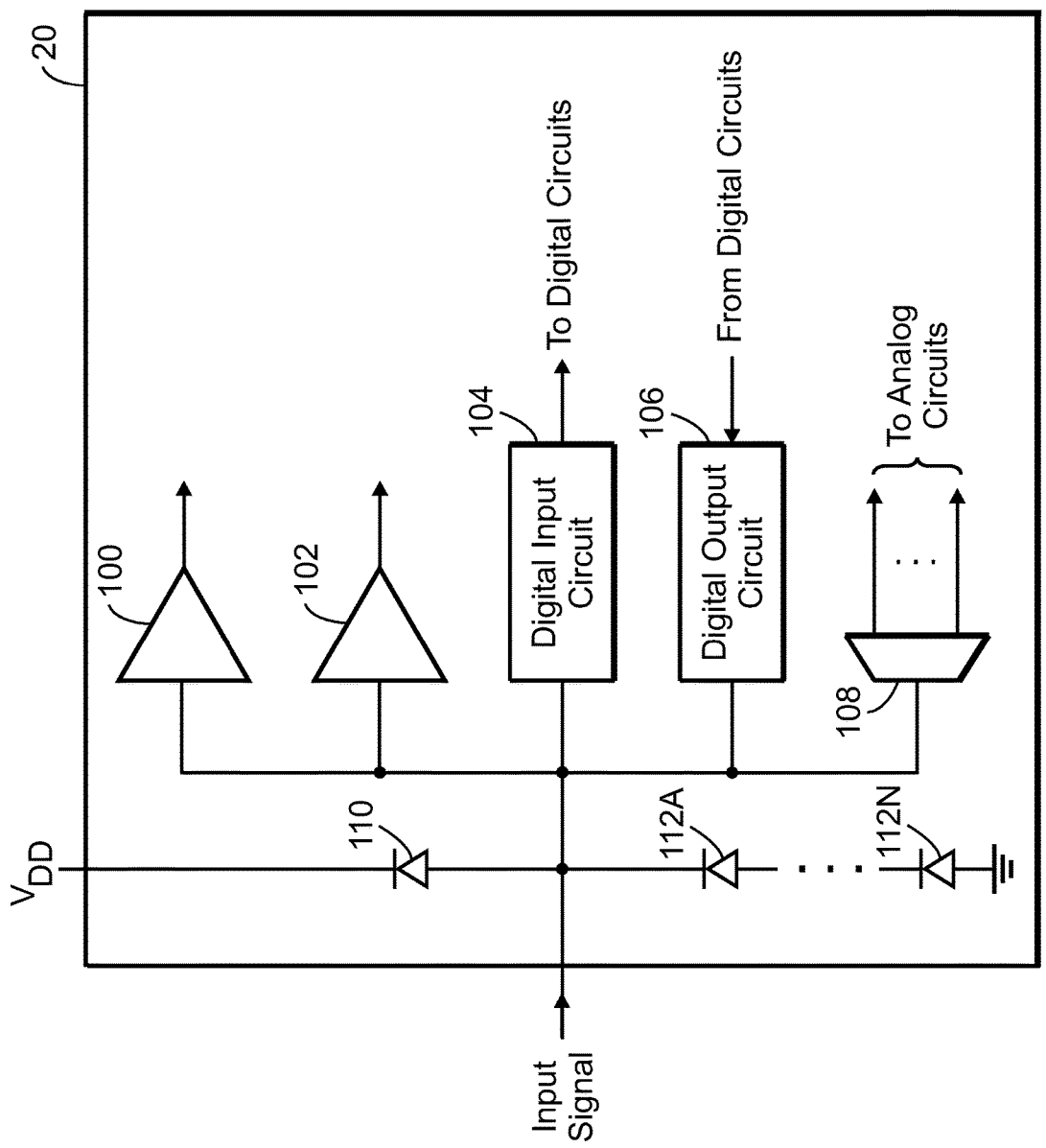
FIG. 5 illustrates a block diagram of a bidirectional interface circuit according to an exemplary embodiment.

Internally to MCU 15, bidirectional interface circuit 20 also includes protection diodes. FIG. 5 illustrates a block diagram of bidirectional interface circuit 20 according to an exemplary embodiment. The block diagram shown in FIG. 5 includes several types of circuitry. In various embodiments, one or more of the blocks or types of circuitry may be omitted, as desired, depending on factors such as design and performance specifications for a given implementation or end-use, etc.

Referring to FIG. 5, bidirectional interface circuit 20 includes amplifier 100, comparator 102, digital input circuit 104, digital output circuit 106, and analog demultiplexer (DeMUX) 108 (to provide an analog input from a source to a selected one of analog circuits or destinations). Note that, although FIG. 5 shows some of the blocks, e.g., amplifier 100 and comparator 102 as having a single input line (or not showing a reference or second input for comparator 102) to facilitate clarity of presentation, the inputs or outputs may be differential, as desired.

Bidirectional interface circuit 20 also includes diode 110 and diodes 112A-112N. Diode 110 and diodes 112A-112N protect the various circuitry (e.g., amplifier 100, comparator 102, digital input circuit 104, digital output circuit 106, and analog DeMUX 108) from excessive positive and negative input voltages (e.g., ESD), respectively. Note that, rather than including diode 110 and diodes 112A-112N as part of bidirectional interface circuit 20, as shown, the diodes may be included as part of the I/O circuitry (or circuitry associated with the respective pads of MCU 15) corresponding to the input of bidirectional interface circuit 20.

In exemplary embodiments, the number of diodes 112 may be two or three (i.e., N=2 or N=3), although other numbers may be used. Generally, the number of diodes 112 depends on the level of expected negative input voltage with which bidirectional interface circuit 20 should operate (i.e., the level that bidirectional interface circuit 20 should tolerate or accommodate).

Figure 6A:
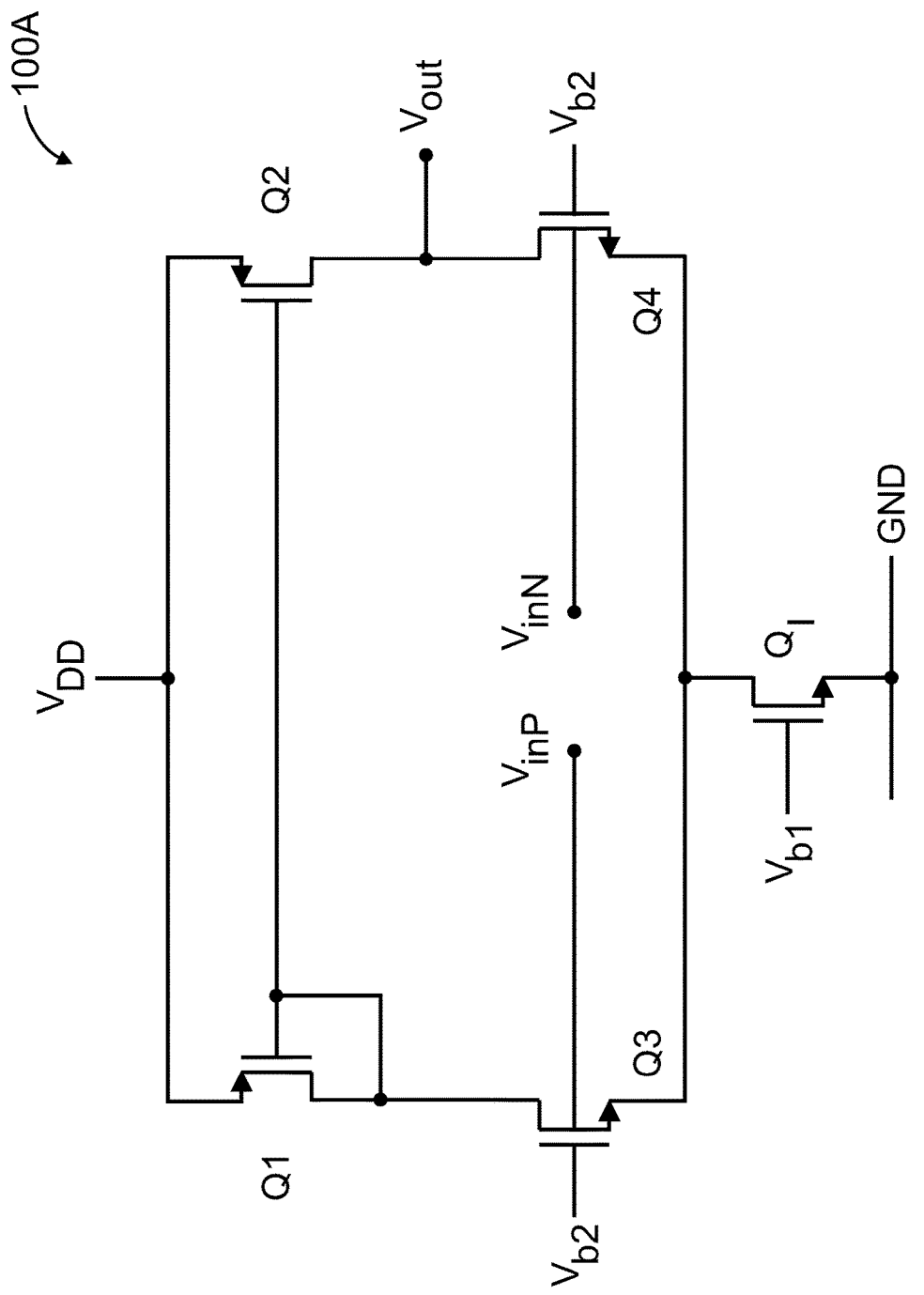
FIGS. 6A-6B show amplifiers used in a bidirectional interface circuits according to exemplary embodiments.

A description of the various blocks of circuitry in bidirectional interface circuit 20 is provided below. Specifically, FIG. 6A shows an amplifier 100A used in bidirectional interface circuit 20 according to an exemplary embodiment. A differential input signal, denoted by $V_{inP}$ and $V_{inN}$, is applied to bulks of MOSFETs Q3 and Q4, respectively. The drain of Q4 provides the output voltage of amplifier 100 (although the drain of Q3 may be used, as desired). The drain of Q4 provides the output voltage of amplifier 100 (although the drain of Q3 may be used, as desired).

The gates of Q3 and Q4 are held at a fixed or constant (or nearly fixed or constant in a practical implementation) bias voltage, $V_{b2}$. Similarly, the gate of $Q_I$ is held at a fixed or constant (or nearly fixed or constant in a practical implementation) bias voltage, $V_{b1}$. MOSFETs Q1 and Q2 act as a current mirror, which is well known to persons of ordinary skill in the art.

The bulks of MOSFETs Q3 and Q4 are coupled to the input voltages $V_{inP}$ and $V_{inN}$. The threshold voltages of MOSFETs Q3 and Q4 depends on their respective bulk-source voltages. The current through Q3 and Q4 is therefore a function of the input voltages $V_{inP}$ and $V_{inN}$. As a result, the circuit shown in FIG. 6A operates as a bulk-driven amplifier. The bulks of transistors Q3 and Q4 can accept input voltages below ground without drawing much input current, which makes the amplifier suitable for bidirectional interface circuit 20.

Figure 6B:
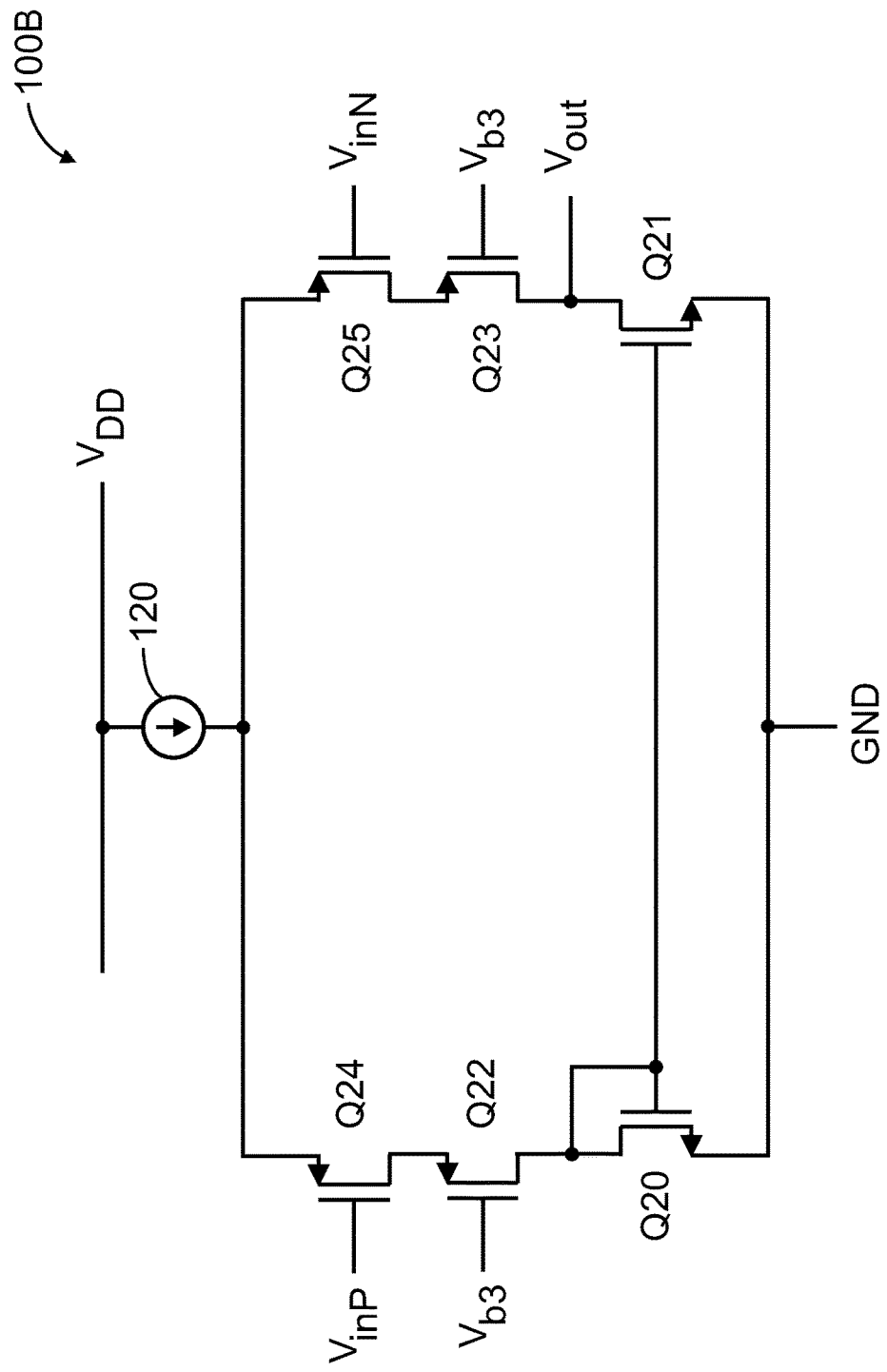

FIG. 6B shows an amplifier 100B used in bidirectional interface circuit 20 according to an exemplary embodiment. A differential input signal, denoted by $V_{inP}$ and $V_{inN}$, is applied to the gates of MOSFETs Q24 and Q25, respectively. The gates of transistors Q22 and Q23 are held at a fixed or constant (or nearly fixed or constant in a practical implementation) bias voltage, $V_{b3}$. The voltages at the drains of Q24 and Q25 are set by transistors Q22 and Q23 to a voltage approximately $V_{b3}+V_{TP}$, where $V_{TP}$ denotes the threshold voltage of the p-channel transistors Q22 and Q23. For input voltages $V_{inP}$ and $V_{inN}$ lower than $V_{b3}$, transistors Q24 and Q25 will operate in the ohmic region as voltage controlled resistors. The current through transistors Q24 and Q25 is therefore a function of the input voltages $V_{inP}$ and $V_{inN}$. Consequently, the circuit operates as an amplifier. The voltages $V_{inP}$ and $V_{inN}$ can extend below ground potential without drawing much input current.

MOSFETs Q21 and Q20 act as a current mirror, which is well known to persons of ordinary skill in the art. Current source 120 provides a constant current (or nearly constant current in a realistic implementation) for the differential amplifier arrangement that includes MOSFETs Q24 and Q25. The drain of Q23 provides the output voltage of amplifier 101B (although the drain of Q22 may be used, as desired).

Note that the amplifiers shown in FIGS. 6A-6B constitutes two types of amplifier that may be used in bidirectional interface circuit 20 in exemplary embodiments. In some other exemplary embodiments, AC-coupled chopper amplifiers may be used. Such amplifiers are disclosed in co-pending U.S. patent application Ser. No. 13/732,135, titled "Amplifier Circuits and Methods of Amplifying an Input Signal," filed on Dec. 31, 2012, and incorporated by reference for all purposes.

Figure 7:
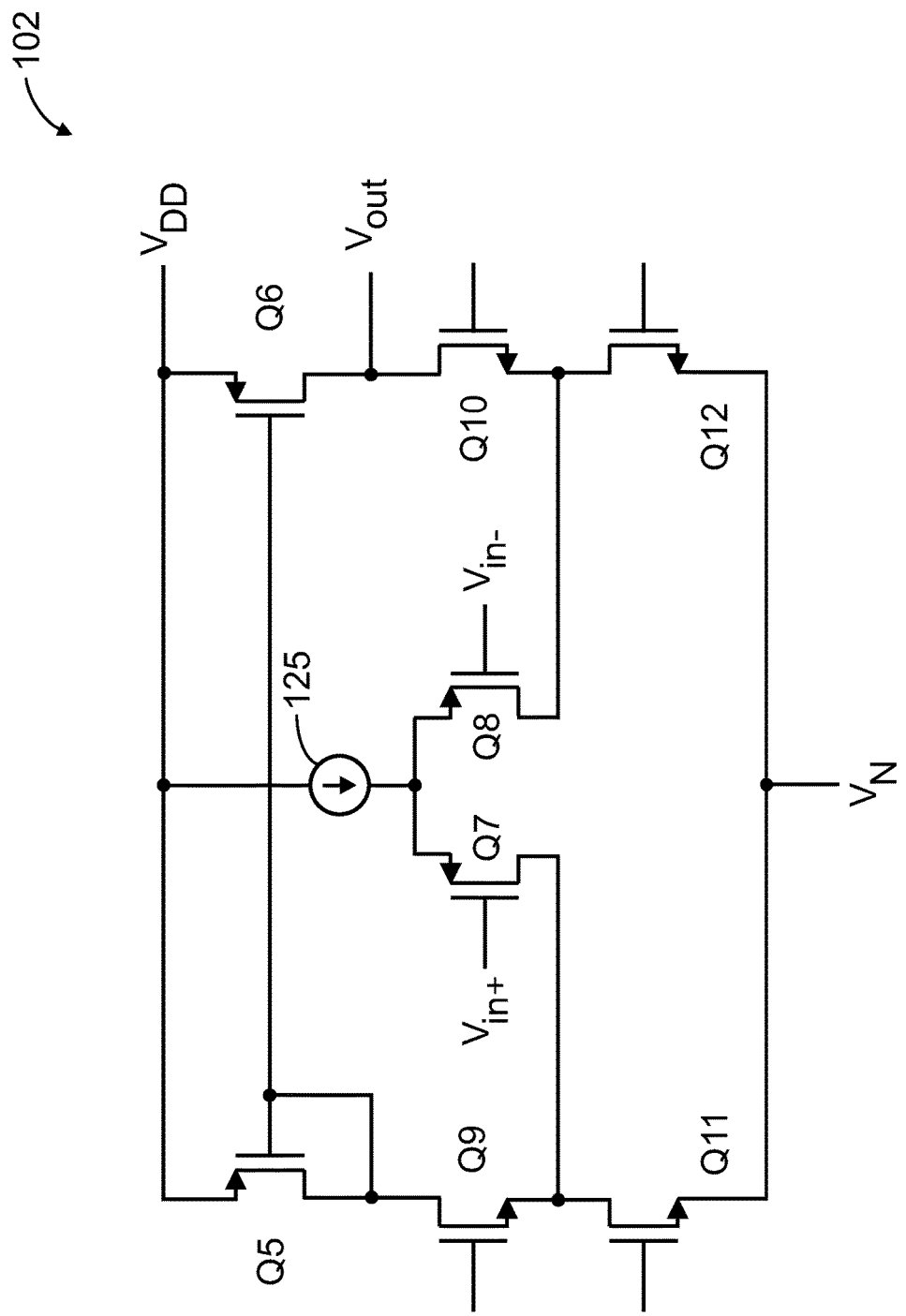
FIG. 7 depicts a comparator used in a bidirectional interface circuit according to an exemplary embodiment.

FIG. 7 depicts a comparator 102 used in bidirectional interface circuit 20 according to an exemplary embodiment. Comparator 102 includes a folded cascode single-state circuit that is coupled to the negative bias voltage ($V_N$) from charge pump 27 (see FIG. 1).

Referring to FIG. 7, transistors Q5 and Q6 form a current mirror that provides current to transistors Q9 and Q10. Transistors Q9 and Q10, whose gates are coupled to an appropriate bias voltage, are arranged in a cascode configuration. Transistors Q11 and Q12, whose gates are coupled to an appropriate bias voltage, form a biased current source.

Transistors Q7 and Q8 are coupled as a differential arrangement, with current source 125 providing source current for the transistors. The positive and negative input voltages (shown as $V_{in+}$ and $V_{in-}$) to comparator 102 are coupled to the gates of transistors Q7 and Q8. The drain of transistor Q10 provides the output voltage of comparator 102 (although the drain of transistor Q9 may be used as an alternative output). Note that the circuitry described above may be used to implement an amplifier or a comparator. For a comparator, the amplifier circuit is followed with a gain stage and a latch. Conversely, for an amplifier, the input stage is coupled as part of a feedback system that can regenerate the original voltages by using a replica.

Figure 8:
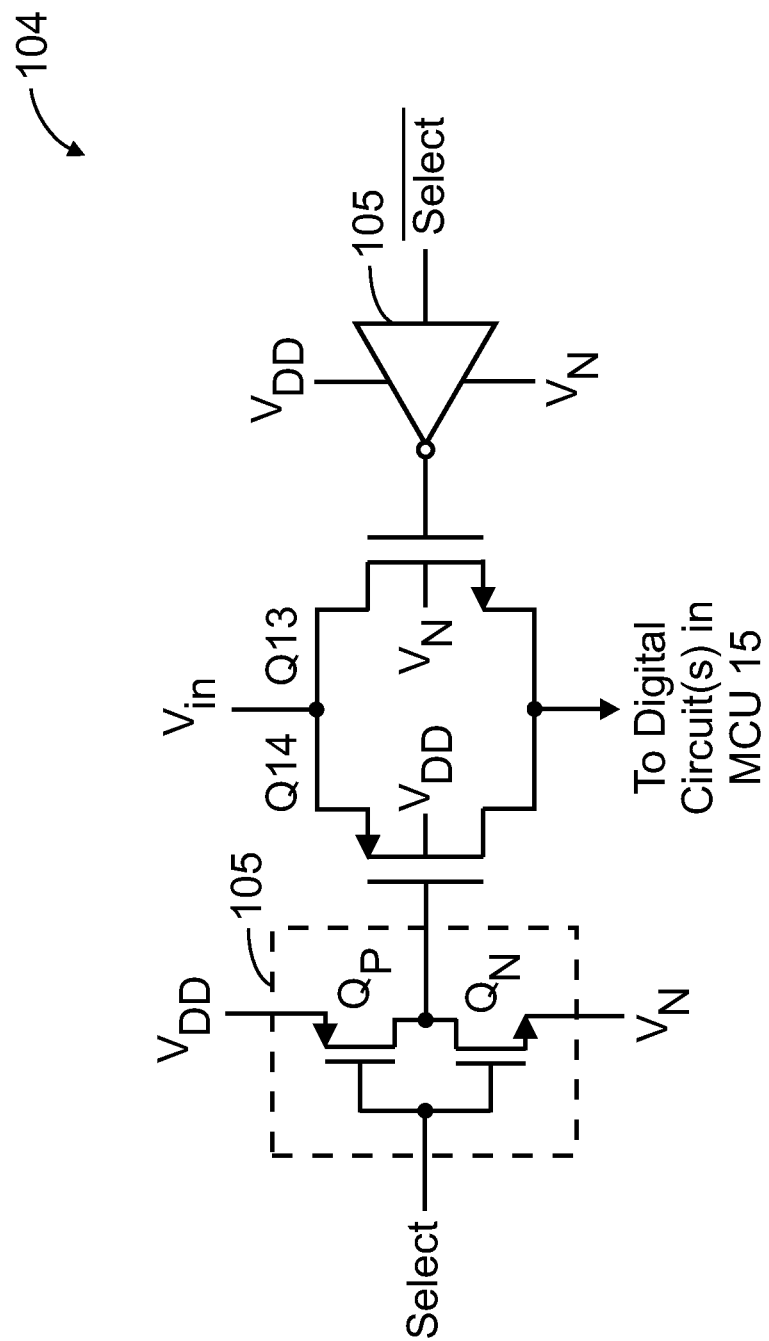
FIG. 8 illustrates a digital input circuit used in a bidirectional interface circuit according to an exemplary embodiment.

FIG. 8 illustrates a digital input circuit 104 used in bidirectional interface circuit 20 according to an exemplary embodiment. Digital input circuit 104 includes transistors Q13 and Q14, coupled to both the input of bidirectional interface circuit 20, and also to digital circuitry in MCU 15 (or bidirectional interface circuit 20). The bulks of transistors Q13 and Q14 are coupled to bias voltage $V_N$ and supply voltage $V_{DD}$, respectively. The gates of transistors Q13 and Q14 are driven by inverters 105. Inverters 105 include transistors $Q_P$ and $Q_N$, coupled as shown in FIG. 8. Supply voltage $V_{DD}$ and bias voltage $V_N$ are also coupled to transistors $Q_P$ and $Q_N$, as shown in FIG. 8. A select signal (labeled "Select"), and its complement, drive the inputs of inverters 105 and, thus, transistors Q14 and Q13, respectively. In response to the select signal, transistors Q13 and Q14 can be turned on or off, as desired, thus selectively coupling $V_{in}$ to digital circuit(s) in MCU 15 (not shown).

Referring to FIG. 8, during operations that involve analog signals, digital input circuit 104 may be disabled by turning off transistors Q13 and Q14. For example, during a current sense operation, transistors Q13 and Q14 are turned off to isolate or protect the digital circuitry in MCU 15 to which they are coupled from bidirectional input voltages involved in the current sense operation.

Conversely, during operations that involve digital signals, digital input circuit 104 may be enabled. In this manner, digital input circuit 104 may be used as part of a general purpose I/O (GPIO) circuit that can accommodate digital signals and also bidirectional analog signals.

Figure 9:
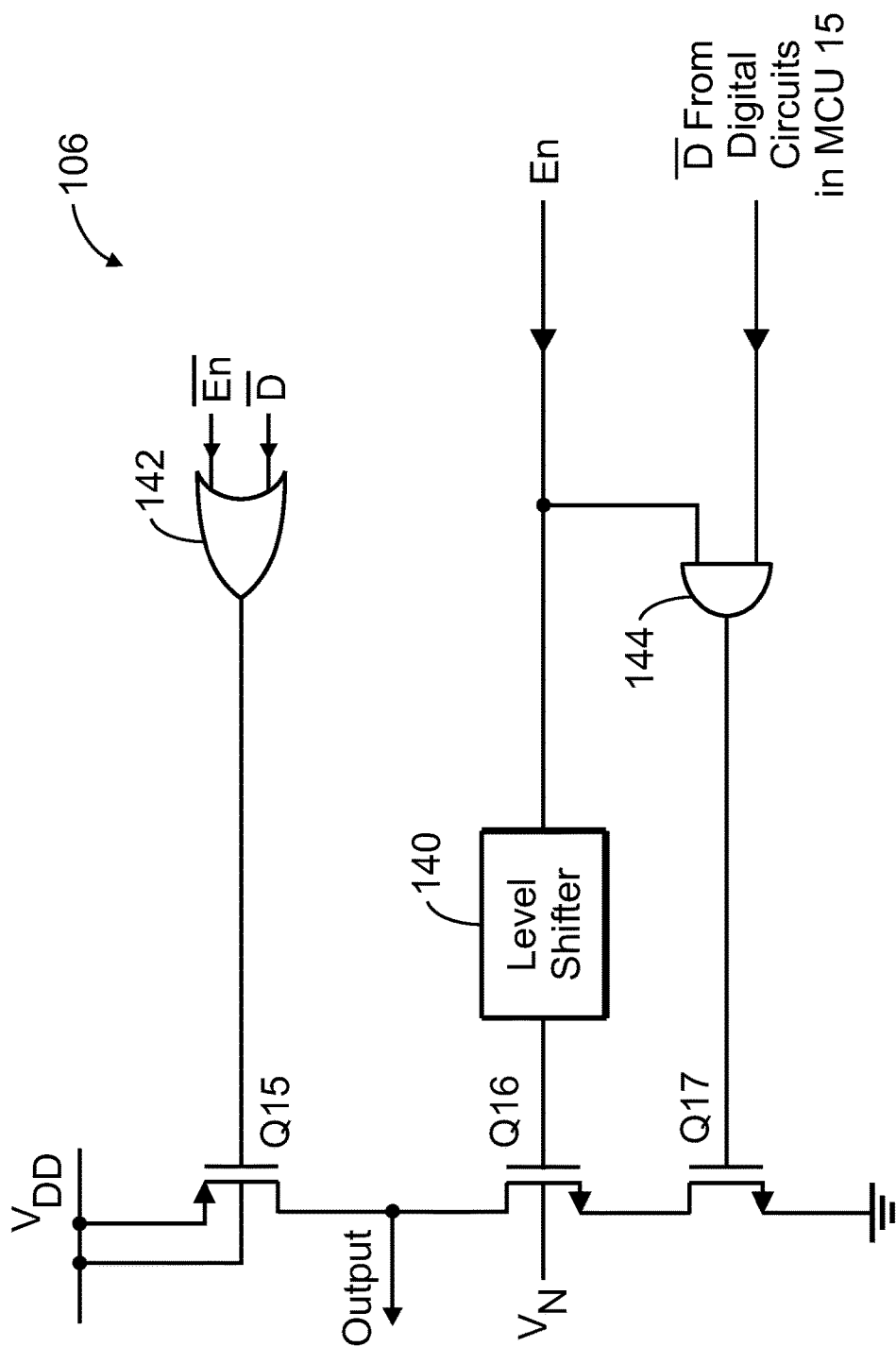
FIG. 9 shows a digital output circuit used in a bidirectional interface circuit according to an exemplary embodiment.

FIG. 9 shows a digital output circuit 106 used in bidirectional interface circuit 20 according to an exemplary embodiment. Digital output circuit 106 receives a data (D) signal from digital circuits (not shown) in MCU 15. Digital output circuit 106 also receives an enable (En) signal (e.g., from CPU 25 (see FIG. 1) or other part of MCU 15). The enable signal facilitates disabling digital output circuit 106 when analog operations (e.g., a current sense operation) are in progress or desired.

OR gate 142 receives the complements of the enable and data signals, and performs a logical operation on those signals. The resulting logic signal controls the gate of transistor Q15. When the circuit is desired to be disabled (En=0) or the data signal is low (D=0), the output of OR gate 142 is high, which turns off transistor Q15.

AND gate 144 performs an logical and operation on the enable signal and the complement of the data signal, and provides the resulting logic signal to the gate of transistor Q17. When the circuit is desired to be enabled (En=1) and the data signal is low (D=0), AND gate provides a logic high to the gate of transistor Q17, which turns on the transistor.

The enable signal is also provided to level shifter 140. Level shifter 140 shifts the enable signal to selectively turn on transistor Q16. When the circuit is desired to be enabled (En=1), level shifter 140 provides a logic high to the gate of transistor Q16, thus turning it on. On the other hand, when the circuit is desired to be disabled (En=0), level shifter 140 shifts the input logic low level to the level of voltage $V_N$, which causes transistor Q16 to turn off. The bulk of transistor Q16 is coupled to the voltage $V_N$.

Figure 10:
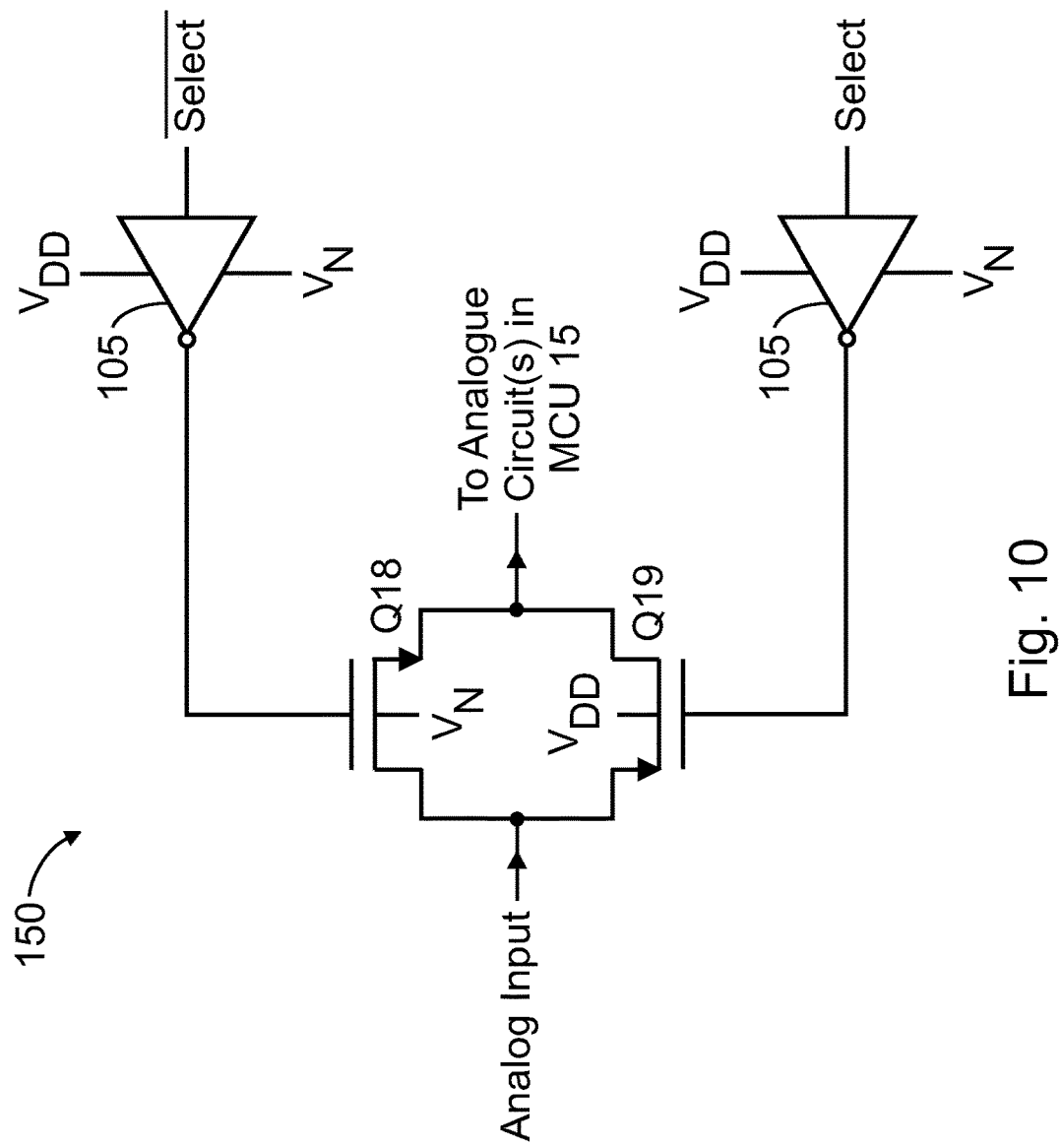
FIG. 10 depicts an analog output circuit used in a bidirectional interface circuit according to an exemplary embodiment.

FIG. 10 depicts an analog input circuit 150 used in a bidirectional interface circuit 20 according to an exemplary embodiment. Analog input circuit 150 may be used to implement analog DeMUX 108 (see FIG. 5).

Referring to FIG. 10, analog input circuit 150 includes transistors Q18 and Q19, coupled to both the input of bidirectional interface circuit 20, and also to analog circuitry in MCU 15 (or bidirectional interface circuit 20).

The bulks of transistors Q18 and Q19 are coupled to bias voltage $V_N$ and supply voltage $V_{DD}$, respectively. The gates of transistors Q18 and Q19 are driven by inverters 105. A select signal (labeled "Select") and its complement (which may be the same or different than the signals in FIG. 8) drive the inputs of inverters 105 and, thus, transistors Q19 and Q18, respectively. In response to the select signal, transistors Q18 and Q19 can be turned on or off, as desired, thus selectively coupling the analog input signal to analog circuit(s) in MCU 15 (not shown).

During operations that involve digital signals, analog input circuit 150 may be disabled by turning off transistors Q18 and Q19. For example, during a digital I/O operation, transistors Q18 and Q19 are turned off to isolate or protect the analog circuitry in MCU 15 to which they are coupled.

Conversely, during operations that involve analog signals, analog input circuit 150 may be enabled. In this manner, analog input circuit 150 may be used as part of a general purpose I/O (GPIO) circuit that can accommodate digital signals and also bidirectional analog signals.

Note that by replicating analog input circuit 150 for each desired analog circuit in MCU 15 that is desired to receive the analog input signal, analog DeMUX 108 (see FIG. 5) may be realized. Control circuitry in bidirectional interface circuit 20 (or in MCU 15, generally) may control the transistors in analog input circuit(s) 150, depending on the desired mode of operation or the desired destination of an analog input signal.

Figure 11:
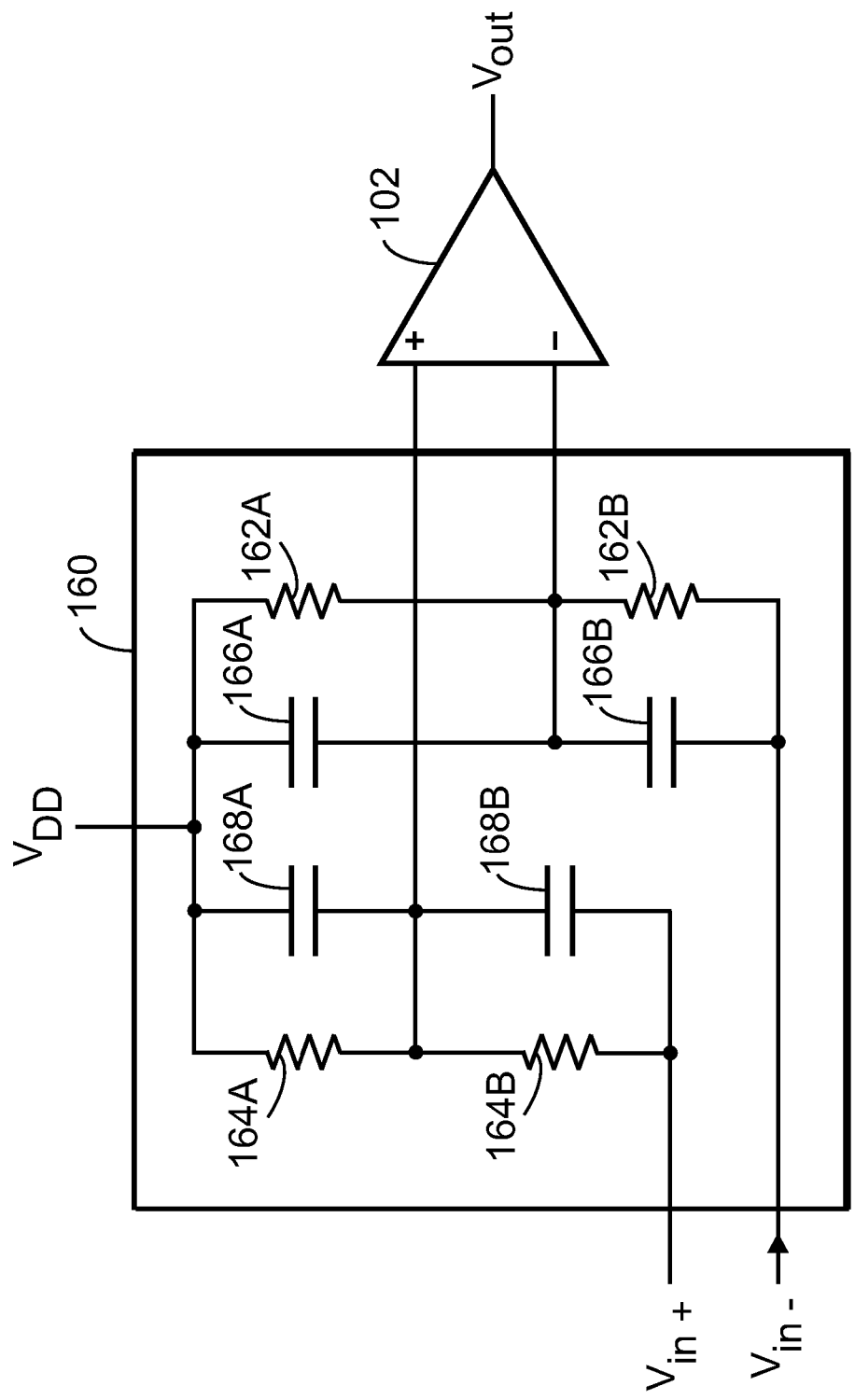
FIG. 11 illustrates an attenuator used in a bidirectional interface circuit according to an exemplary embodiment.

In some embodiments, bidirectional interface circuit 20 may include an attenuator to attenuate the input signals of amplifier 102 (see FIGS. 5 and 6). FIG. 11 illustrates an attenuator 160 used in a bidirectional interface circuit according to an exemplary embodiment.

Specifically, attenuator 160 includes resistors 162A-162B and resistors 164A-164B. Resistors 162A and 162B form a voltage divider that can attenuate the negative input voltage ($V_{in-}$) of amplifier 102 by a desired amount. Similarly, resistors 164A and 164B form a voltage divider that can attenuate the negative input voltage ($V_{in+}$) of amplifier 102 by a desired amount. In this manner, the inputs of amplifier 102 may be protected from overload or an over-voltage condition.

Capacitors 166A-166B and 168A-168B are coupled in parallel with resistors 162A-162B and resistors 164A-164B, respectively, to provide filtering of the input signal represented by $V_{in-}$ and $V_{in+}$. More specifically, in some embodiments, resistors 162A-162B and resistors 164A-164B may have relatively large values in order to realize a desired level of attenuation. Capacitors 166A-166B and 168A-168B allow input signals of higher frequency to be applied to bidirectional interface circuit 20 or amplifier 102 (than would be the case in the absence of capacitors 166A-166B and 168A-168B).

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired.

Furthermore, one may realize the functionality of a single block in several circuit blocks, as desired. The choice of circuit implementation depends on various factors, such as particular design and performance specifications for a given implementation. Other modifications and alternative embodiments in addition to those described here will be apparent to persons of ordinary skill in the art. Accordingly, this description teaches those skilled in the art the manner of carrying out the disclosed concepts, and is to be construed as illustrative only.

The forms and embodiments shown and described should be taken as illustrative embodiments. Persons skilled in the art may make various changes in the shape, size and arrangement of parts without departing from the scope of the disclosed concepts in this document.

For example, persons skilled in the art may substitute equivalent elements for the elements illustrated and described here. Moreover, persons skilled in the art may use certain features of the disclosed concepts independently of the use of other features, without departing from the scope of the disclosed concepts.

The invention claimed is:

1. An apparatus comprising:
   an integrated circuit (IC) powered by a positive supply voltage, the IC comprising:
      a voltage generator to accept as an input the positive supply voltage and to generate a negative voltage as an output; and
      a bidirectional interface circuit coupled to receive the negative voltage as a supply voltage, the interface circuit further coupled to receive an input signal of the IC,
      wherein the input signal of the IC has a negative common-mode voltage, and wherein the bidirectional interface circuit accommodates the negative common-mode voltage of the input signal of the IC.

2. The apparatus according to claim 1, further comprising a circuit coupled to the IC, wherein the circuit provides the input signal of the IC.

3. The apparatus according to claim 2, wherein the circuit comprises a transducer.

4. The apparatus according to claim 2, wherein the circuit comprises a sensor.

5. The apparatus according to claim 2, wherein the circuit comprises a current sense resistor.

6. The apparatus according to claim 1, wherein the voltage generator comprises a charge pump.

7. The apparatus according to claim 6, wherein the positive supply voltage is received from a power supply external to the IC.

8. The apparatus according to claim 6, wherein the negative voltage output of the charge pump comprises a negative supply voltage provided to a set of circuits in the bidirectional interface circuit.

9. The apparatus according to claim 8, wherein the set of circuits in the bidirectional interface circuit comprises a digital input circuit coupled to receive the input signal of the IC.

10. The apparatus according to claim 8, wherein the set of circuits in the bidirectional interface circuit comprises an amplifier coupled to receive the input signal of the IC.

11. An apparatus comprising:
    a signal source to provide an analog output signal;
    a microcontroller unit (MCU) powered from a positive supply voltage, the MCU comprising:
       a charge pump that receives the positive supply voltage of the MCU as an input, and generates a negative output voltage; and
       an interface circuit to receive the negative voltage as a supply voltage, the interface circuit further coupled to receive the analog output signal of the signal source, wherein the analog output signal of the signal source has a negative common-mode voltage, and wherein the interface circuit accommodates the negative common-mode voltage of the analog output signal of the signal source.

12. The apparatus according to claim 11, wherein the signal source comprises a transducer or a sensor.

13. The apparatus according to claim 11, wherein the signal source comprises a current sense resistor.

14. The apparatus according to claim 11, further comprising an inverter coupled to supply power to a motor.

15. The apparatus according to claim 11, wherein the current sense resistor provides a signal related to a current flowing in a circuit branch of the inverter.

16. A method of processing signals in an integrated circuit (IC) that receives power from a positive supply voltage, the method comprising:
- generating a negative voltage from the positive supply voltage;
- supplying the negative voltage as a supply voltage to a bidirectional interface circuit;
- receiving in the bidirectional interface circuit an input signal of the IC, the input signal of the IC having a negative common-mode voltage,
- wherein the bidirectional interface circuit accommodates the negative common-mode voltage of the input signal of the IC.

17. The method according to claim 16, wherein generating the negative voltage from the positive voltage further comprises using a charge pump to accept as an input the positive voltage and to generate the negative voltage as an output.

18. The method according to claim 16, wherein receiving in the bidirectional interface circuit the input signal of the IC further comprises receiving the input signal of the IC from a sensor, a current sense resistor, or a transducer.

19. The method according to claim 16, wherein supplying the negative voltage as a supply voltage to the bidirectional interface circuit further comprises supplying the negative voltage to a digital input circuit coupled to receive the input signal of the IC.

20. The method according to claim 16, wherein supplying the negative voltage as a supply voltage to the bidirectional interface circuit further comprises supplying the negative voltage to a digital output circuit, and wherein the digital output circuit provides a digital output signal of the IC.

\* \* \* \* \*